United States Patent
Medina

(10) Patent No.: US 6,863,260 B2
(45) Date of Patent: Mar. 8, 2005

(54) PISTON ACTUATOR INCORPORATING PARTITIONED PRESSURE CHAMBERS

(76) Inventor: Peter Johann Medina, 8740 Esplanade Park La., San Diego, CA (US) 92123

( * ) Notice: Subject to any disclaimer, the term of this patent is extended or adjusted under 35 U.S.C. 154(b) by 64 days.

(21) Appl. No.: 10/621,365

(22) Filed: Jul. 18, 2003

(65) Prior Publication Data
US 2005/0012058 A1 Jan. 20, 2005

(51) Int. Cl.[7] .......................... F16K 15/02; F16K 27/00
(52) U.S. Cl. ........................ 251/324; 251/310
(58) Field of Search ................ 251/309–312, 251/318–334

(56) References Cited

U.S. PATENT DOCUMENTS

| | | | |
|---|---|---|---|
| 4,084,486 A | * | 4/1978 | Juvonen ...................... 91/276 |
| 4,491,155 A | * | 1/1985 | Meyer et al. ........... 137/625.66 |
| 4,543,935 A | | 10/1985 | Tuckey |
| 5,305,788 A | * | 4/1994 | Mayeux ...................... 137/583 |
| 5,375,994 A | | 12/1994 | Friderich et al. |
| 5,971,296 A | * | 10/1999 | Fukano et al. .............. 239/119 |
| 6,386,508 B1 | | 5/2002 | Steil et al. |
| 6,394,417 B1 | * | 5/2002 | Browne et al. ............. 251/331 |

* cited by examiner

Primary Examiner—Paul J. Hirsch
(74) Attorney, Agent, or Firm—Thomas M. Thibault

(57) ABSTRACT

A multi-chambered piston actuator incorporates partitioned pressure chambers, each chamber delivering an actuation force to a common target object based on multiple presence signals and/or resources. The chambers are formed in part by one or more tiers, each tier having a surface area on which one or more pressure signals act. The resultant force on the tiers move the common target to control, for example, a valve.

6 Claims, 4 Drawing Sheets

PISTON ACTUATOR INCORPORATING PARTITIONED PRESSURE CHAMBERS

BACKGROUND

I. Field of Use

The present invention relates generally to the automotive industry and more specifically to a piston actuator that incorporates partitioned pressure chambers.

II. Description of the Related Art

It can be appreciated that actuators have been in use for years. Typically, actuators are comprised of diaphragmatic fuel pressure regulators, valve actuators, throttle actuators, EGR valve actuators, wastegate valves, and an array of actuators used in controlling a myriad of functions of an internal combustion engine. In addition, other piston-based actuators, referred to as cylinders, are available that perform the same actuation functions as the above examples via different control mechanisms.

A variety of problems exist in conventional actuators today. Foremost is that conventional actuators are unreliable. Principally, they cannot sustain high working or peak pressures since they currently employ polymer, cloth, or polymer-impregnated cloth diaphragms. It is also difficult to accurately calculate the dynamic actuation force imparted by such diaphragms. Another problem with conventional actuators are that cylinder-based actuators can only deliver actuation force based on a single surface's available surface area and cannot impart force to a common target based on multiple or varying signals or sources introduced into unique actuation substrates. Yet another problem with conventional piston actuators is that in order for diaphragmatic actuators to deliver force based on pressure signals and/or sources that are either mutually exclusive or have unequal points of introduction in a given timeline, they require prohibitively complex mechanical architectures that often require the use of separate components to form operating chambers which seal and secure, for example, a diaphragm in place.

While present actuators may be adequate for the particular purpose to which they address, they are not as suitable for applications that require a combination of signals and/or sources to drive a piston. Nor are present actuators suitable for applications that produce extreme working or peak pressures. Therefore, there is a need for an actuator that will overcome the shortcomings of the prior art.

SUMMARY

In view of the foregoing disadvantages inherent in the known types of multi-chamber piston actuator now present in the prior art, the present invention provides a new a piston actuator that incorporates partitioned pressure chambers construction wherein the same can be utilized for a device that has multiple chambers that will receive pressure signals/sources to drive a common piston that will take these multiple pressure signals/sources and generate a resultant activation force.

The general purpose of the present invention, which will be described subsequently in greater detail, is to provide a new a piston actuator that incorporates partitioned pressure chambers that has many of the advantages of the multi-chamber piston actuator mentioned heretofore and many novel features that result in a new a piston actuator that incorporates partitioned pressure chambers which is not anticipated, rendered obvious, suggested, or even implied by any of the prior art multi-chamber piston actuator, either alone or in any combination thereof.

To attain this, the present invention generally comprises an apparatus comprising a cover comprising a planar surface having a first cavity extending into the inner planer surface, the first cavity defined by a first inner wall having a first cross-sectional area and a recessed cavity wall. The apparatus further comprises a housing, the housing comprising a second cavity, the second cavity comprising a second inner wall defining a second cross-sectional area, a third inner wall defining a third cross-sectional area, a first end wall defining a boundary between the second inner wall and the third inner wall, and a second end wall defining a bottom of the cavity and having a cross-section substantially similar to the third cross-sectional area. The housing further comprises a first port and a second port. The apparatus additionally comprises a piston comprising a shaft, the shaft comprising a first shaft end having a cross-section substantially similar to the first cross-sectional area for insertion into the first cavity, a second shaft end having a cross-section substantially similar to the third cross-sectional area, the piston further comprising a tier extending radially from the shaft, the tier having a cross-sectional area substantially similar to the second cross-sectional area, the tier further having a top surface, a bottom surface, and an outer wall, wherein the first port is connected to a first chamber formed by the tier top surface, the second inner wall, the planar surface, and a shaft surface, and the second port is connected to a second chamber formed by the tier bottom surface, the second inner wall, the shaft surface, and the first end wall.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

One object of the present invention is to provide a piston actuator that incorporates partitioned pressure chambers that will overcome the shortcomings of the prior art devices.

Another object of the present invention is to provide a piston actuator that incorporates partitioned pressure chambers for a device that has multiple chambers that receives pressure signals and/or sources to drive a common piston that will take these multiple pressure signals and generate a resultant activation force.

Another object is to provide a piston actuator that incorporates partitioned pressure chambers that can deliver an actuation force to a common target object based on multiple pressure signals and/or sources that are either mutually exclusive or have unequal points of introduction in a given timeline, that will be applied to mutually exclusive substrates.

Another object is to provide a piston actuator that incorporates partitioned pressure chambers that eliminates the complexity of multi-chambered diaphragmatic actuators that require myriad mechanical components to achieve the ability to deliver multiple actuation forces to a common substrate based on multiple pressure signals and/or sources that are either mutually exclusive or have unequal points of introduction in a given timeline.

Yet another object is to provide a piston actuator that incorporates partitioned pressure chambers that can deliver the reliability of cylinder actuators by sustaining the high working or peak pressures, while having the ability to deliver force based on multiple pressure signals and/or sources.

Yet another object is to provide a piston actuator that incorporates partitioned pressure chambers that can ratio the input of multiple pressure signals/sources to create a resultant actuation force.

Other objects and advantages of the present invention will become obvious to the reader and it is intended that these objects and advantages are within the scope of the present invention.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present invention comprises a multi-chamber piston actuator suitable for use in applications where controlling the flow of materials, such as liquids, gases, or solids, is desired. While the piston actuator is described herein with respect to an automobile fuel pressure regulator, it should be understood that the present invention could be used in other applications to control the flow of solids, liquids, or gases, as needed. To the accomplishment of the above and related objects, this invention may be embodied in the form illustrated in the accompanying drawings, attention being called to the fact, however, that the drawings are illustrative only, and that changes may be made in the specific construction illustrated without departing from the novel aspects of the invention.

Figure 1:
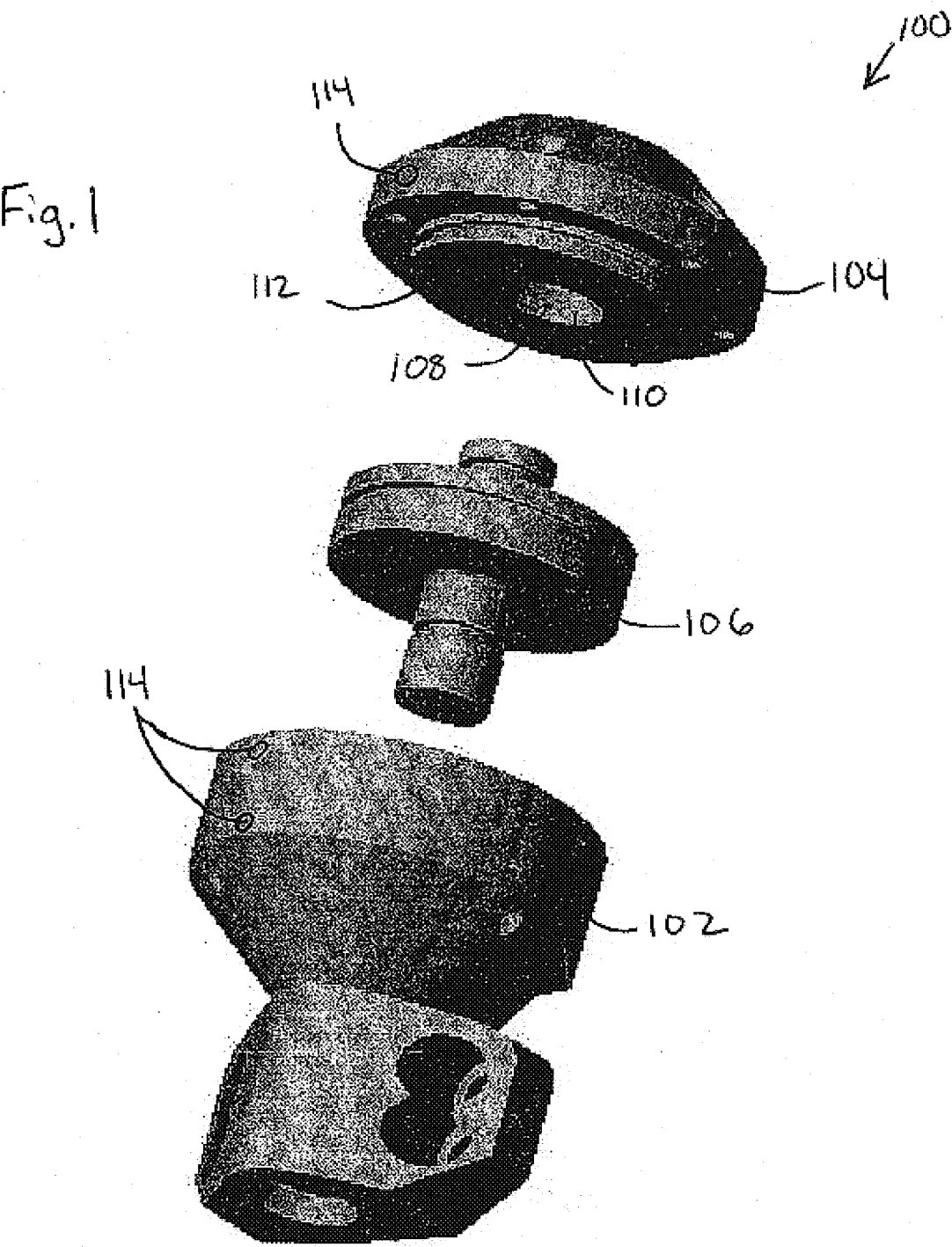
FIG. 1 illustrates an exploded view of one embodiment of a multi-chamber piston actuator in accordance with the teachings herein.

FIG. 1 illustrates an exploded view of one embodiment of a multi-chamber piston actuator 100, comprising a housing 102, a cover 104, and an piston 106. Housing 102 is an object that houses piston 106. Housing 102 will reflect, in the form of a complimentary cavity, the geometric profiles of piston 106. The external dimensions and appearance of housing 102 generally will not impact the operation of piston 106 as it relates to the ideas presented herein, and will usually pertain to aesthetic design elements. However, the external features of housing 102 will generally incorporate features that allow for mounting of piston actuator 100, as well as interfaces specific to the application that the assembly will be used.

Cover 104 comprises a planar surface 112 through which a cavity 108 is located. Cavity 108 is used to house a first end of piston 106. Cavity 108 comprises an inner wall 110 defining a circular cross-sectional area in one embodiment. The cross-sectional area could alternatively comprise other shapes, such as an oval, square, rectangle, etc. A recessed cavity wall defines an end of cavity 108 (not shown). This recessed wall may be completely solid, or a passage may lead from the recessed cavity wall through a port located on top of cover 104. Cover 104 is designed to mate with housing 102 using known fastening techniques, such as screws, rivets, bolts, etc. Alternatively, or in addition, cover 104 may comprise a threaded annular portion so that cover 104 screws into in inner annular surface of housing 102. When assembled, piston 106 is encapsulated by housing 102 and cover 104, movable in an axial direction by the application of one or more signals, sources, or other forces.

Figure 3:
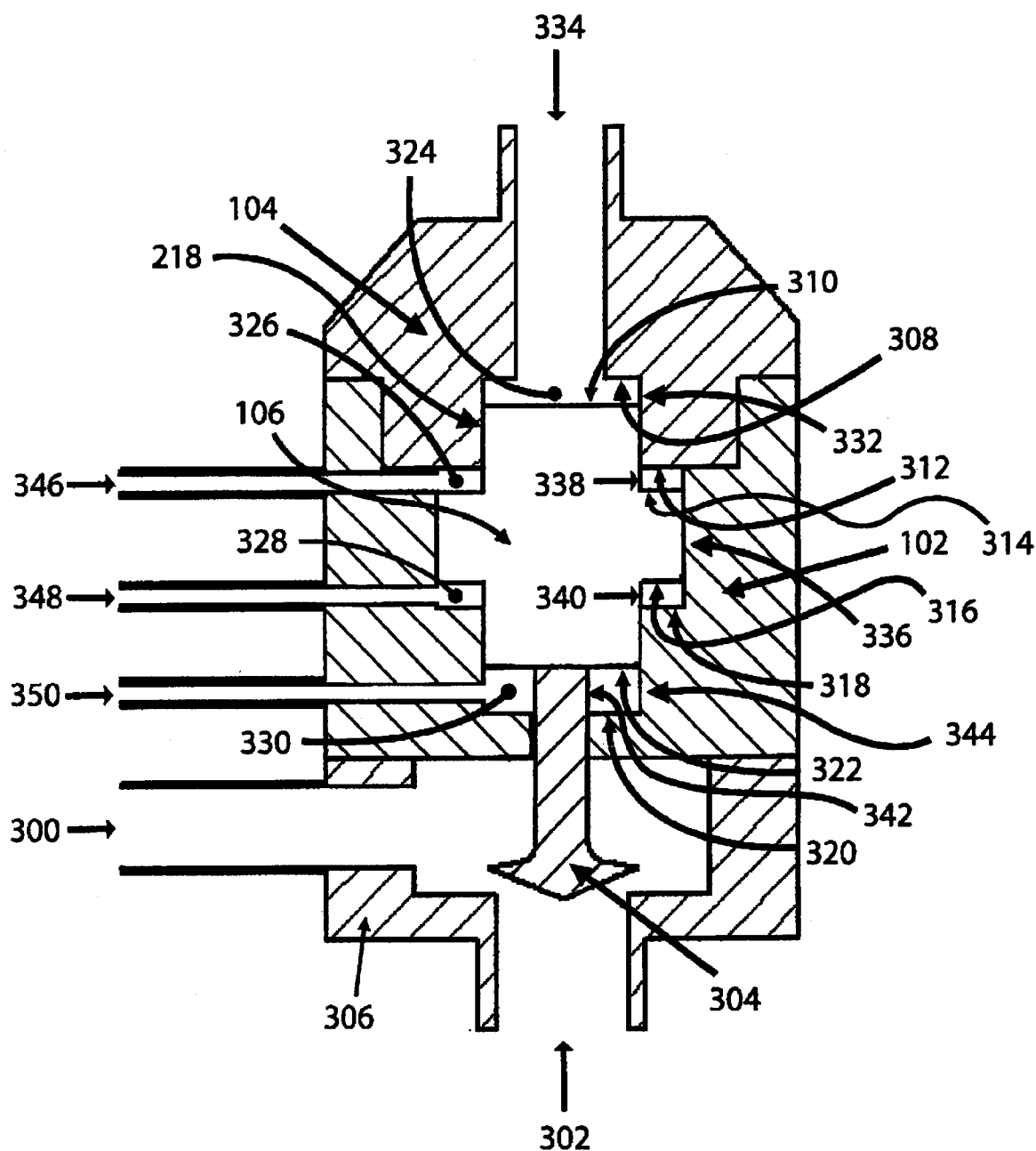
FIG. 3 illustrates a cross-sectional view of one embodiment of a multi-chamber piston actuator in accordance with the teachings herein, as assembled.

The internal representation of the housing comprises at least one housing cavity that mirrors the global features of piston 106. The dimensions of this housing cavity will deviate slightly from that of piston 106 to allow travel of piston 106 in an axial direction. In one embodiment, the housing cavity comprises a first inner wall defining a cross-sectional area substantially similar to a cross-sectional area of a first tier of piston 106 (described later herein) and a second inner wall defining a cross sectional area substantially similar to a cross-sectional area of a second tier of piston 106. These are shown in detail in FIG. 3. The housing further comprises a first end wall defining a boundary between said second inner wall and said third inner wall, and a second end wall defining an "end" or "bottom" of the housing cavity and having a cross-section substantially similar to said third cross-sectional area (these features are also shown in FIG. 3).

Housing 102 and/or cover 104 additionally comprises one or more ports 114, each port comprising a passage which leads to the housing cavity through one or both inner walls. The ports enable pressure signals to be introduced into piston actuator 100 to control piston 106. The pressure signals may be supplied by rigid or flexible hoses originating from any number of sources, such as an exhaust manifold, a wastegate valve, an air compressor, a turbocharger outlet, a supercharger outlet, ambient air, a pressure regulator, and others. The ports 114 may additionally comprise hardware for interfacing such hoses to housing 102.

During assembly, piston 106 is placed in the complimentary cavity of housing 102. Within this cavity, the relationship between sealing surfaces of piston 106 (i.e., tier outer walls) and housing 102/cover 104 will generate chambers that will change in volume as either piston 106, or housing 102, travels along an axis common to both components. These chambers are where one or more pressure signals are introduced to produce a resultant force on piston 106. There are many applications, from automotive to aerospace to food processing, and many more, that may find a multi-chambered piston actuator useful to control the flow of various materials or substances.

Housing 102, cover 104, and piston 106 may comprise of readily available materials including, but not limited to, plastics, metals, etc. The manufacturing of the said components can be performed via machining processes, near net casting with post process machining for finishing tolerances, net injection molding, vacuum molding and any other readily available process adaptable to manufacturing housing and piston.

There exists many common methods for manufacturing the various components of the multi-chamber piston actuator 100, including standard wrought machining, electro-discharge machining, near-net casting, injection molding and a host of other commonly available industrial methods.

Figure 2:
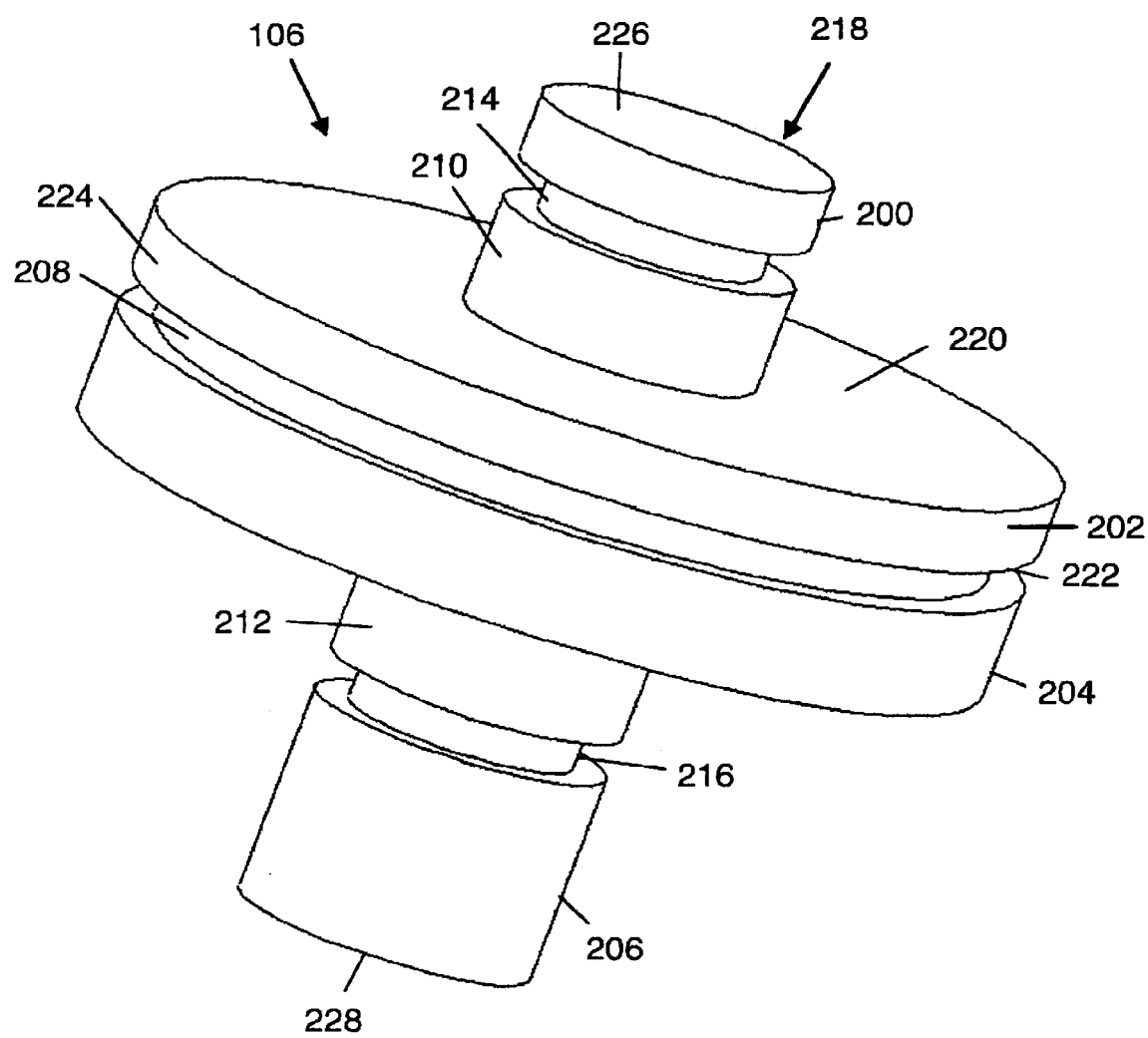
FIG. 2 illustrates one embodiment of piston used in the multi-chamber piston actuator of FIG. 1.

FIG. 2 illustrates one embodiment of piston 106. As shown, piston 106 comprises an elliptical or polygonal-profiled object extruded in one axis of varying diameters. Piston 106 comprises a shaft 218 and tiers 200–214, each tier comprising a different geometric profile from other tiers, or levels, extruded on piston 106. Each tier may have different diameters, widths or dimensions to define a surface area available for a pressure signal to act upon. Shaft 218 comprises a longitudinal extension, such as a rod, or cylinder, having one of any number of cross-sections, extending the length of piston 106 around which the various tiers are imposed. Shaft 218 additionally comprises a first shaft end 226 and a second shaft end 228. In some cases, a tier may have a diameter equal to the diameter of shaft 218, for example, tiers 200, 210, 212, and 206. A resultant force on piston 106 is produced by the combination of pressure signals acting upon the different surface areas defined by the tiers.

The geometric profiles representing the tiers do not necessarily have to be axially aligned. The most common implementation of piston 106 will be one wherein piston 106 will travel in an axial direction that is perpendicular to the geometric profiles of the tiers. The piston/housing relationship typically assumes that piston 106 will be the component that will travel and move in relation to housing 102 and cover 104. However, in alternative embodiments, housing 102 and cover 104 can also travel in relation to piston 106, which may be fixed in space relative to a mounted component.

Each tier generally comprises a top surface, a bottom surface, and an outer wall, such as top surface 220, bottom surface 222, and an outer wall 224. A top surface of one tier may be a bottom surface of another tier. For example, top surface 220 of tier 202 is the same surface as a bottom surface of tier 210; bottom surface 222 is the same surface as a top surface of tier 208. As mentioned previously, the outer walls of some, or all, of the tiers are in contact with the various inner walls defining cavities of housing 102 and cover 104. This contact forms chambers that change in volume as either piston 106, or housing 102, travels along an axis common to both components. The surfaces of the cavity inner walls may act as a sealing surface with either the material of the tiers or with a seal housed by, or integrated into, the tier outer walls. Alternatively, housing 102/cover 104 may comprise materials for providing a sealing surface with the tiers. Furthermore, independent seals such as O-rings, for example, can also be integrated into the tiers and/or shaft 218, to mate with the housing cavity inner surfaces to create a seal. Any number of existing seal technologies can be integrated into piston 106, including, but not limited to, o-rings, washers and metal seals. In the example of FIG. 2, such independent seals may be placed around tier 214, tier 208, or tier 216.

Although shown in FIG. 2 as a piston of single-piece construction, piston 106 can alternatively be constructed of distinct and separate objects that fit the aforementioned description and that are connected together to form resultant piston 106. Accordingly, piston 106 may be manufactured of any currently available materials, such as plastic, metal, or any other rigid or semi-rigid material, depending on each particular application.

Each tier extends radially from shaft 218 and comprises a cross-sectional area (i.e., when piston 106 viewed on end) substantially similar to a cross-sectional area defining at least one cavity of housing 102.

FIG. 3 illustrates a cross-sectional view of one embodiment of a multi-chamber piston actuator 100, as assembled. It comprises cover 104 that is annularly mated with housing 102, the combination of cover 104 and housing 102 encapsulating piston 106. In one embodiment, multi-chamber piston actuator 100 includes inlet port 300, discharge port 302 and sealing surface 306 as a single unit. In another embodiment, these components are part of another structure, such as an automotive fuel control system, wherein multi-chamber piston actuator 100 is mounted to the structure. Inlet port 300 and discharge port 302 are components of a valving mechanism defined by the movements of valve 304 in relation to a scaling surface 306. In either embodiment, valve 304 is typically connected to piston 106 and is part of multi-chamber piston actuator 100.

Piston 106 is seated within housing 102 and cover 104. As illustrated, housing 102 and cover 104 comprise annular cavities having cross-sectional areas substantially similar to the diameters of the various tiers of piston 106. In this embodiment, only one tier is shown, defined by a radial extension of piston 106 and terminating with outer wall 336. The piston 106 comprises a shaft 218 defined by first shaft end 310 and a second shaft end 322. The annular cavities generally are formed to provide enough room for piston 106 to travel in an axial direction, i.e., up and down as shown in FIG. 3. Piston 106's travel may be limited by recessed cavity wall 308 against first shaft end 310, planar surface 312 against upper tier surface 314, first end wall 318 against lower tier surface 316, and/or second end wall 320 against second shaft end 322. When assembled, the annular cavities in both cover 104 and housing 102, in combination with piston 106, produce chambers 324, 326, 328, and 330 that are defined by the geometric constraints of first inner wall 332, first shaft end 310, and recessed cavity wall 308; outer wall 336, outer tier wall 338, upper tier surface 314, and planar surface 312; outer wall 336, outer tier wall 340, lower tier surface 316, and first end wall 318; and valve surface 342, second shaft end 322, second end wall 320, and second inner wall 344, respectively.

Pressure signals are communicated to chambers 324, 326, 328, and 330 via ports 334, 346, 348, and 350, respectively. They may be applied as a positive pressure or a negative pressure. The pressure signals typically comprise gas, liquids, or a combination of the two. In addition, the each port could transmit a unique pressure type. For example, the pressure signals communicated to ports 334 and 346 could comprise a gas while the pressure signals communicated to ports 348 and 350 could comprise a liquid. The pressure signals introduced to ports 334, 346, 348 and 350 can either be the same or mutually exclusive, and may be introduced at varying points time so as to control the position of valve 304 relative to surface 306, and thereby controlling the flow of material from discharge port 302. In any given application of the current invention, there can be a multiplicity of chambers defined by annular walls, end walls, and tier surfaces used to create forces operating against piston 106. The quantity of such chambers, tier surface areas, or other chamber-defining characteristics need not be equal or similar.

Piston 106 will move in one of two directions, either away from recessed cavity wall 308 or away from second end wall 320. For example, if a pressurized fluid is communicated through port 346 into chamber 326, that fluid, barring any pressure signals in chambers 324, 328, or 330, will act on end wall 312 to push against upper tier surface 314 to effectively move the piston 106 in a direction that allows for the expansion of the pressurized fluid into chamber 326. The piston 106 will move in a direction where the force will find a differential, i.e., in a downward movement in this example.

The piston 106 will be displaced in a direction proportional to the net combined force operating against each tier surface. Each of these forces are, in turn, proportional to the signal pressure applied by each port to a respective tier surface area. In the present example, the signal pressures applied to chambers 324 and 326 are offset by the signal pressures applied to chambers 328 and 330. In other words, if the same pressure signal is applied to, for example, ports 346 and 348, and the tier surfaces of each chamber are equal, the piston 106 generally will not move. If a positive pressure is communicated to port 346 and a negative pressure is communicated to port 348, and the tier surfaces of each chamber are equal, the piston 106 will move in a downward direction at twice the force of each individual pressure signal.

One of the primary objectives of the invention is to have a main chamber (i.e., the housing cavity) defined by one or more inner walls, within the diameters of this main chamber can be partitioned and exist other chambers. The sum of the diameters of the chambers within the master chamber generally will equal the diameter of the master chamber. The tier surface areas of these partitioned chambers, defines a resultant force that one or more pressure signals impart, as a ratio to the overall surface area of the master chamber.

Figure 4:
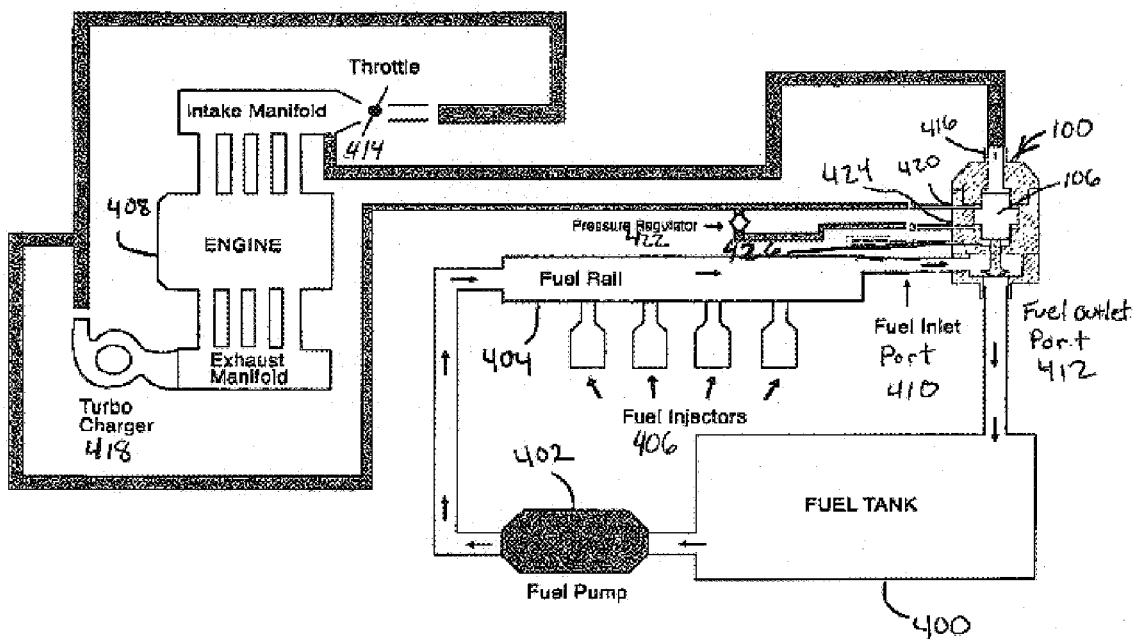
FIG. 4 is a functional block diagram illustrating one embodiment of the multi-chamber actuator of FIG. 1 used to regulate fuel pressure in an internal combustion engine.

FIG. 4 is a functional block diagram illustrating one embodiment of the present invention used to regulate fuel pressure in an internal combustion engine. In this embodiment, the multi-chamber piston actuator 100 is commonly known as a fuel pressure regulator.

Referring now to FIG. 4, fuel is drawn from the fuel tank 400 by fuel pump 402, which pressurizes the fuel and then sent to fuel rail 404. The fuel in fuel rail 404 becomes a source for fuel injectors 406 to draw from and deliver into the internal combustion engine 408. The operating pressures in the fuel system are managed by multi-chamber piston actuator 100, in this case a fuel pressure regulator. The fuel pressure is controlled by valving the amount of fuel passing through the multi-chamber piston actuator 100 via fuel inlet port 410 and fuel outlet port 412. The fuel is then discharged back into fuel tank 400. In this example, internal combustion engine 408 is "supercharged", thereby producing various operating pressures that are applied to the various chambers in the multi-chamber piston actuator 100. These dynamic pressures operate on various surface areas of piston 106, which in turn determine the amount of resultant force imparted on piston 106 and, in turn, a valve between the fuel inlet port 410 and the fuel outlet port 412. The operating pressures found in area 414 of the internal combustion engine 408, behind the throttle, typically range from negative 1 bar to pressures exceeding 2 bars. They are then signaled, or provided, to port 416 of the multi-chamber piston actuator 100, thereby generating an actuation force relative to the amount of piston surface area with which port 416 communicates.

Turbocharger 418 produces pressurized exhaust that range from atmospheric pressure to pressures exceeding 2 bars. This pressurized exhaust is then provided to port 420 of the multi-chamber piston actuator 100, which acts on a respective surface area of piston 106 to generate an actuation force on the piston 106.

A pressure regulator 422 may be used to bleed pressure from the pressures signaled into port 420 and provide the bled pressure into port 424 of the multi-chamber piston actuator 100. This pressure is also used to exert an actuation force on a respective surface area of piston 106 to control movement of the piston 106. This operating pressure is generally less than or equal to the pressures signaled to port 420.

Finally, port 426 may reference atmospheric pressure, which also plays a part in determining the resultant force applied to the piston 106. Thus, each port receives a different operating pressure signals from different sources to determine a resultant actuation force on piston 106. The fuel pressure in the system may then be controlled depending on the pressures applied to each of the ports, as well as the piston 106 surface areas associated with each port.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

I claim:

1. A multi-chambered piston actuator, comprising:

a cover comprising a planar surface having a first cavity extending into the inner planer surface, the first cavity defined by a first inner wall having a first cross-sectional area and a recessed cavity wall;

a housing comprising a second cavity, the second cavity comprising a second inner wall defining a second cross-sectional area, a third inner wall defining a third cross-sectional area, a first end wall defining a boundary between said second inner wall and said third inner wall, and a second end wall defining a bottom of the cavity and having a cross-section substantially similar to said third cross-sectional area, the housing further comprising a first port and a second port; and a piston comprising a shaft, the shaft comprising a first shaft end having a cross-section substantially similar to said first cross-sectional area for insertion into said first cavity, a second shaft end having a cross-section substantially similar to said third cross-sectional area, said piston further comprising a tier extending radially from said shaft, said tier having a cross-sectional area substantially similar to said second cross-sectional area, the tier further having a top surface, a bottom surface, and an outer wall; wherein the first port is connected to a first chamber formed by said tier top surface, said second inner wall, said planar surface, and a shaft surface, and the second port is connected to a second chamber formed by said tier bottom surface, said second inner wall, said shaft surface, and said first end wall.

2. The piston actuator of claim 1, further comprising:

an inlet port for providing material to the piston actuator;

a discharge port for allowing the material to exit the piston actuator; and a valve connected to the second shaft end, the valve for controlling a flow rate of the material through the discharge port.

3. The piston actuator of claim 1, further comprising:

a valve connected to the second shaft end; and a third port connected to a third chamber, the third chamber formed by said second shaft end, said third inner wall, said second end wall, and a surface of said valve.

4. The piston actuator of claim 1, further comprising:

a third port connected to a third chamber, the third chamber formed by said first shaft end, said first inner wall; and said recessed cavity wall.

5. The apparatus of claim 1, further comprising means for sealing the tier outer wall with the first inner wall.

6. The apparatus of claim 5, wherein the means for sealing comprise an O-ring.

* * * * *